United States Patent
Lin et al.

(10) Patent No.: US 11,042,798 B2
(45) Date of Patent: Jun. 22, 2021

(54) REGULARIZED ITERATIVE COLLABORATIVE FEATURE LEARNING FROM WEB AND USER BEHAVIOR DATA

(71) Applicant: Adobe Inc., San Jose, CA (US)

(72) Inventors: Zhe Lin, Fremont, CA (US); Jianchao Yang, San Jose, CA (US); Hailin Jin, San Jose, CA (US); Chen Fang, San Jose, CA (US)

(73) Assignee: Adobe Inc., San Jose, CA (US)

( * ) Notice: Subject to any disclaimer, the term of this patent is extended or adjusted under 35 U.S.C. 154(b) by 1141 days.

(21) Appl. No.: 15/082,877

(22) Filed: Mar. 28, 2016

(65) Prior Publication Data

US 2017/0228659 A1   Aug. 10, 2017

Related U.S. Application Data

(60) Provisional application No. 62/291,208, filed on Feb. 4, 2016.

(51) Int. Cl.
| | |
|---|---|
| *G06N 3/08* | (2006.01) |
| *G06N 5/04* | (2006.01) |
| *G06N 20/00* | (2019.01) |
| *G06F 16/532* | (2019.01) |
| *G06F 16/58* | (2019.01) |
| *G06N 3/04* | (2006.01) |

(52) U.S. Cl.
CPC ............. *G06N 3/08* (2013.01); *G06F 16/532* (2019.01); *G06F 16/58* (2019.01); *G06N 3/0454* (2013.01); *G06N 5/04* (2013.01); *G06N 20/00* (2019.01)

(58) Field of Classification Search
CPC .................................. G06F 16/58; G06N 5/04
See application file for complete search history.

(56) References Cited

U.S. PATENT DOCUMENTS

| | | | | |
|---|---|---|---|---|
| 9,659,056 | B1* | 5/2017 | Chechik | G06F 16/2462 |
| 10,290,040 | B1* | 5/2019 | Misra | G06N 3/088 |
| 2002/0127529 | A1* | 9/2002 | Cassuto | G09B 5/02 |
| | | | | 434/335 |
| 2012/0179634 | A1* | 7/2012 | Chen | G06N 20/00 |
| | | | | 706/12 |

(Continued)

OTHER PUBLICATIONS

Chen et al. (Feature-Based Matrix Factorization, Dec. 2011, pp. 1-12) (Year: 2011).*

*Primary Examiner* — George Giroux
(74) *Attorney, Agent, or Firm* — Kilpatrick Townsend & Stockton LLP

(57) ABSTRACT

Certain embodiments involve learning features of content items (e.g., images) based on web data and user behavior data. For example, a system determines latent factors from the content items based on data including a user's text query or keyword query for a content item and the user's interaction with the content items based on the query (e.g., a user's click on a content item resulting from a search using the text query). The system uses the latent factors to learn features of the content items. The system uses a previously learned feature of the content items for iterating the process of learning features of the content items to learn additional features of the content items, which improves the accuracy with which the system is used to learn other features of the content items.

20 Claims, 6 Drawing Sheets

(56) References Cited

U.S. PATENT DOCUMENTS

| | | | |
|---|---|---|---|
| 2014/0244631 A1* | 8/2014 | Arthur | G06F 17/2785 |
| | | | 707/723 |
| 2015/0170536 A1* | 6/2015 | Lan | G09B 7/02 |
| | | | 434/350 |
| 2015/0213361 A1* | 7/2015 | Gamon | G06N 20/00 |
| | | | 706/12 |
| 2015/0278200 A1* | 10/2015 | He | G06F 17/2785 |
| | | | 704/2 |
| 2015/0363688 A1* | 12/2015 | Gao | G06N 3/04 |
| | | | 706/27 |
| 2016/0267637 A1* | 9/2016 | Hsiao | G06F 16/24578 |
| 2016/0282156 A1* | 9/2016 | Ott | G01D 18/00 |
| 2016/0379133 A1* | 12/2016 | Shteingart | G06N 20/00 |
| | | | 706/12 |

* cited by examiner

REGULARIZED ITERATIVE COLLABORATIVE FEATURE LEARNING FROM WEB AND USER BEHAVIOR DATA

CROSS-REFERENCE TO RELATED APPLICATIONS

This disclosure claims priority to U.S. Provisional Application No. 62/291,208, entitled "Regularized Iterative Collaborative Feature Learning From User Behavior Data," filed Feb. 4, 2016, the entirety of which is hereby incorporated by reference herein.

TECHNICAL FIELD

One or more embodiments of the present disclosure relate generally to machine-learning. More specifically, one or more embodiments of the present disclosure relate to systems and methods for training and applying machine-learning to iteratively learn features of content items, such as images, using web and user behavior data to improve recognition of digital content items or to improve image identification in various applications.

BACKGROUND

Certain computing applications perform image recognition, in which computers perform one or more of acquiring, processing, analyzing, and understanding images in order to produce numerical or symbolic information. Image recognition is facilitated by feature learning. Feature learning involves, for example, training neural network algorithms or other classifier algorithms to recognize certain image content and classify other image content as being similar to the recognized image content. In particular, feature learning finds a set of representative features by collecting features from images, such as depictions of trees in training images, and "training" the classifier algorithm to "learn" (i.e., recognize) the features. For example, a trained classifier algorithm that has learned what types of image objects should be classified as trees will later recognize new images of trees and assign those images to a "tree" category.

Some image recognition systems use sparse data (e.g., an incomplete data set) to learn features of content items (e.g., images). It is challenging to learn features of the content items using sparse data. For example, image recognition systems using sparse data will inaccurately learn features from training images, which will cause the image recognition system to provide inaccurate classification results. Improved techniques for learning image features are therefore desirable.

SUMMARY

Various embodiments of the present disclosure provide systems and methods for iteratively learning features of content items based on web data and user behavior data. In one example, a method for iterative collaborative feature learning usable for accurately matching image content in queries to corresponding image results includes obtaining, by a processor, a data set that includes data indicating whether a user providing a text query clicked on a content item resulting from a search of the text query. The method further includes populating, by the processor, missing data in the data set. The method further includes determining, by the processor, a first latent factor of the content item from the data set. The first latent factor includes information about a feature of the content item. The method also includes learning, by the processor, a first feature of the content item based on the first latent factor and iteratively learning, by the processor, a second feature of the content item by adding the first feature into the data set to decrease a sparsity of the data set. Each iteration can comprise: decomposing the data set to identify a second latent factor of the content item based on the data set; grouping the first latent factor and the second latent factor into a cluster; and learning the second feature of the content item based on the cluster. The method employs training a neural network to learn features by learning to classify a plurality of content items based at least partially on the first or the second feature of the content item.

Additional features and advantages of exemplary embodiments of the present disclosure will be set forth in the description which follows, and in part will be obvious from the description, or will be learned by the practice of such exemplary embodiments. The foregoing summary is not an extensive overview, and it is not intended to identify key elements or indicate a scope. Rather the foregoing summary identifies aspects of embodiments as a prelude to the detailed description presented below.

DETAILED DESCRIPTION

Figure 1:
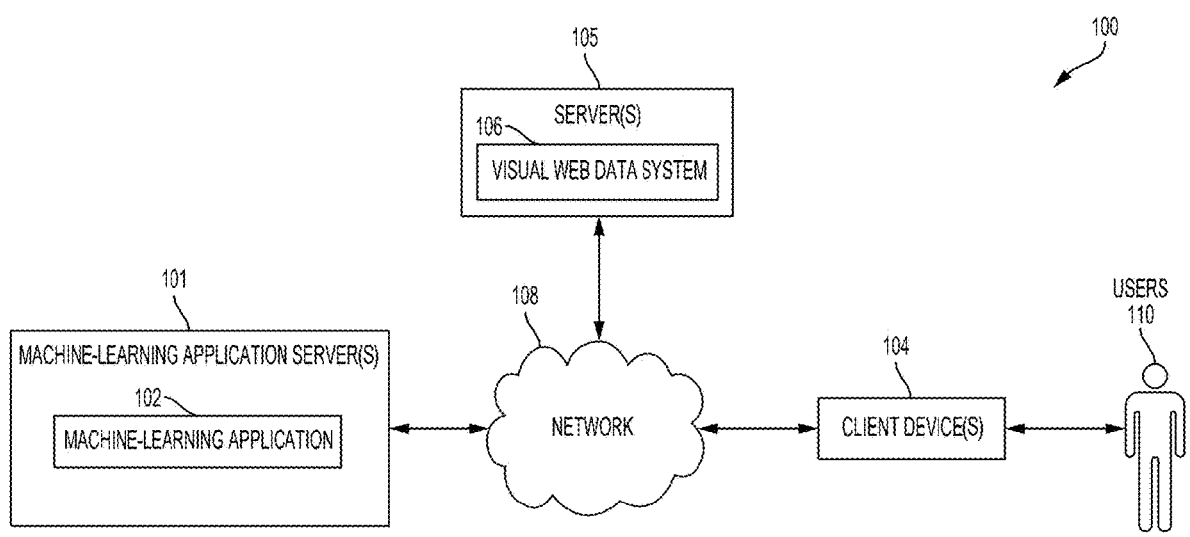
FIG. 1 is a block diagram of an exemplary environment in which a machine-learning application for iteratively learning features of content items operates in accordance with one or more embodiments.

Certain embodiments of the present disclosure include techniques, methods, systems, technology, etc., for identification or recognition of digital content items or images by iteratively learning features of content items using web and user behavior data. In at least some embodiments, the iterative learning includes iteratively populating a data set. In contrast to existing systems or methods, which use sparse data sets in their analysis and compromising accuracy, the disclosed iterative learning methods or techniques improve an accuracy with which digital content items or images can be recognized or the accuracy with which a query image can be matched to corresponding images by iteratively generating a data set that is less sparse resulting in a more robust data set that can be used for various applications. In some embodiments, a machine-learning application, which is executed on one or more servers or other suitable computing devices, learns features of content items (e.g., image features) from web data associated with the content items. This web data includes, for example, a user's text query or keyword query for a content item and the user's interactions with the content items based on the query (e.g., a user's click on a content item that results from a search using the text query). The machine-learning application iteratively learns new features of content items by using previously learned features of the content items. For example, in some embodiments, the web data that the machine-learning application uses to learn a feature of the content items is initially sparse (e.g., incomplete or missing data). The machine-learning application uses a previously learned feature of the content items to populate the web data (e.g., by adding the previously learned feature to the web data). Using the populated web data, the machine-learning application learns additional features of the content items.

In some embodiments, the iterative learning process improves the accuracy with which the machine-learning application learns additional features of the content items by, for example, encouraging visually similar pairs of content items to have similar latent factors. For example, by using previously learned features of content items to populate the data set and learn additional features of content items, the machine-learning application described herein can be used to accurately recognize other content items or identify relevant content items (e.g., identify relevant content items based on a query content item provided to the machine-learning application by a user).

For example, an image search system or other web data system hosts or otherwise provides access to a variety of content items (e.g., images, photographs, videos, etc.). In some embodiments, users of the web data system search for relevant content items using text or keyword queries. The web data system searches the content items and provides one or more content items as a result of the query. In some embodiments, the relevance of a content item that results from a query is indicated by a user's interactions with the content item (e.g., clicking on the content item). For example, user interaction with one or more content items hosted by the web data system causes the web data system to store data indicating each content item clicked on or viewed by each user providing a text or keyword query. In some embodiments, the web data system provides the data indicating the text or keyword query and the associated content item that the user clicks on or views to the machine-learning application as web data.

In some embodiments, the machine-learning application obtains the web data, which includes content item data, user data, or user behavioral data. The machine-learning application identifies or determines initial latent factors of the content items from the web data. The latent factors include features of the content items that are not explicitly described or indicated by the web data. Examples of latent factors include terms or phrases describing an image, which are not directly indicated or explicit in the image itself. In some embodiments, a latent factor encodes information about the similarity of content items or the semantics of content items (e.g., description or meaning associated with the content items).

In some embodiments, the machine-learning application learns an initial feature of the content items using the initial latent factors. After learning the initial feature, the machine-learning application uses the initial feature in an iterative process for learning additional features of the content items. For example, the machine-learning application includes the initial feature in the web data to populate a missing entry or missing data in the web data and identifies other latent factors of the content items using the web data that includes the initial feature. In some embodiments, the machine-learning application groups the initial latent factors and the other latent factors together and uses the group to learn additional features of the content items. In some embodiments, iterating the process allows the machine-learning application to learn new features of the content items with improved quality by, for example, populating missing data in the web data using a previously learned feature. In some embodiments, iterating the process improves the accuracy with which the machine-learning application is used to learn additional features by encouraging visually similar pairs of content items to have similar latent factors.

In some embodiments, the machine-learning application then trains a machine-learning model using the learned features of the content items. The machine-leaning application uses the trained machine-learning model for classifying subsequently received content items and performing one or more actions based on the classification (e.g., identifying or recommending similar content items).

As used herein, the term "content item" refers to any data or information that is presentable to a user by a computing device. Examples of a content item include, but are not limited to, one or more digital images, digital media, audio files, electronic documents, advertisements, and multimedia presentations. In some embodiments, groups of content items include, but are not limited to, multiple content items. For example, an image gallery includes various digital images. A group of content items includes the same or similar content items or random or unrelated content items. For example, a group of content items includes several different types of content items.

As used herein "web data" or "visual web data" includes content item data, user data, or user behavioral data. In some embodiments, the visual web data is from a search engine. Data from the search engine is implicit or explicit. In some embodiments, implicit image search engine data provides an indirect reflection of a user's opinion of a content item. For example, when a user views a content item, the user signals a relevance of, an interest in, or a preference for the content item. As another example, when a user devotes less than a threshold amount of time to a content item, the user is signaling irrelevance of, disinterest in, or dissatisfaction for the content item. Image search engine data includes data maintained by an image search engine system (e.g., Google, Bing, Fotolia, BEHANCE, etc.).

As used herein "content item data" refers to any data about a content item. Examples of content item data include a type of the content item or any other data associated with an identity of the content item.

As used herein "user data" refers to any data describing or otherwise indicating characteristics of a user that has accessed a website. Examples of user data include a user's query text, key words, or phrase.

As used herein, "user behavioral data" refers to data describing or otherwise indicating a user's interaction with content items based on the user data (e.g., data that indicates a user's interaction with content items that result from a search using the user's query text).

As used herein "latent factors" include representations or features of the content items that are not directly measurable. As an example, latent factors include representations or factors that are inferred through modeling by using other features. In some embodiments, latent factors include representations that are generated by modeling indirect data through feature learning. In some embodiments, the latent factor encodes information about the similarity of content items or the semantics of content items (e.g., description or meaning associated with the content items).

As used herein "machine-learning" includes a process of constructing and implementing algorithms that learn from and make predictions on data. In some embodiments, machine-learning operates by building models from example inputs (e.g., training), such as visual web data, in order to make data-driven predictions or decisions. In another embodiment, machine-learning is used for data mining, and statistical pattern recognition, such as collaborative feature learning, or learning features from visual web data.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative examples but, like the illustrative examples, should not be used to limit the present disclosure.

FIG. 1 is a block diagram of an exemplary environment 100 in which a machine-learning application 102 for iteratively learning features of content items operates. In some embodiments, the exemplary environment 100 includes the machine-learning application 102, which is executed by one or more machine-learning application servers 101. The exemplary environment 100 also includes one or more client devices 104, which are communicatively coupled to a visual web data system 106 executed on one or more servers 105. The machine-learning application 102, the client device 104, and the visual web data system 106 communicate via the network 108, which includes one or more networks or uses one or more communications platforms or technologies suitable for transmitting data or communication signals. For example, the visual web data system 106 sends visual web data to the machine-learning application 102 via the network 108.

In the example depicted in FIG. 1, a user 110 interfaces with the client device 104 to access the visual web data system 106. The user 110 is an individual (i.e., human user), a business, a group, or other entity. Although FIG. 1 illustrates only one user 110, in some embodiments, the exemplary environment 100 includes multiple users. Each of the users interacts with the visual web data system 106 using a corresponding client device 104.

In some embodiments, the client device 104 represents various types of client devices. For example, the client device 104 is a mobile device (e.g., a mobile telephone, a smartphone, a PDA, a tablet, a laptop, a camera, a tracker, a watch, a wearable device, etc.). The client device 104, however, in some embodiments, is a non-mobile device (e.g., a desktop computer or another type of client device).

In some embodiments, the visual web data system 106 maintains a collection of content items including, for example, images, audio segments, videos, etc., which users view or with which users otherwise interact. For example, the visual web data system 106 allows users to view, add, edit, remove, or otherwise interact with or modify content items maintained by the visual web data system 106. Additionally or alternatively, the visual web data system 106 enables users to search (e.g., by using a text, keyword or phrase query) content items maintained by the visual web data system 106 or the client devices 104. In some embodiments, the visual web data system 106 stores the content items outside of the visual web data system 106 while still facilitating users' access to the content items via the visual web data system 106.

In some embodiments, the user 110 uses the client device 104 to access the visual web data system 106. For example, the user 110 accesses content items on the visual web data system 106 via the client device 104. As users interact with content items via the visual web data system 106, the visual web data system 106 collects and stores content item data, user data, or user behavioral data. As an example, when the user 110 interacts with a particular content item (e.g., when the user 110 clicks on a content item that results from a text query or search of content items on the visual web data system 106), the visual web data system 106 collects and stores data associated with the user interaction.

In some embodiments, the machine-learning application 102 identifies latent factors for a text or keyword query provided by the user or latent factors for content items on the visual web data system based on the visual web data. The machine-learning application 102 also uses the content item latent factors or the text query latent factors to learn features of the content items. As an example, machine-learning application 102 obtains the visual web data from the visual web data system 106. The visual web data includes data related to a text query provided by a user, an image resulting from a search of the visual web data system 106 based on the text query provided by the user, and an indication of whether the user clicked on the resulting image. The machine-learning application 102 obtains the data in a matrix format or in any other form and extracts semantic data from the obtained data. In some embodiments, the machine-learning application 102 uses various latent factor models or regularized variants of the latent factor models to identify or determine initial latent factors or latent factors of the content items from the visual web data. For example, the machine-learning application 102 decomposes a matrix containing the visual web data to determine the initial latent factors. In some embodiments, decomposing a matrix includes factorizing the matrix into a product of matrices.

In some embodiments, the machine-learning application 102 learns an initial feature of the content items using the initial latent factors. For example, the machine-learning application 102 generates groups by clustering the initial latent factors and uses the groups to learn the initial feature of the content items. As an example, the machine-learning application 102 divides the initial latent factors of the content items into text query latent factors and content item latent factors. The machine-learning application 102 groups the content item latent factors together. When the content item latent factors are grouped together, the machine-learning application 102 learns the initial feature of the content items by training a machine-learning model with the group of content item latent factors. The machine-learning application 102 also finds a neighborhood for every content item using a first iteration of the initial feature of the content items. A neighborhood for a content item includes other visually or semantically similar content items (e.g., with regard to terms associated with or describing features of the content items).

In some embodiments, the machine-learning application 102 iterates the process for learning additional features of the content items after the machine-learning application 102 learns the initial feature of the content items. For example, the machine-learning application 102 determines other latent factors of the content items using the visual web data and a previously learned feature of the content items (e.g., the initial feature of the content item). As an example, the machine-learning application 102 includes the previously learned feature of the content items in the visual web data. The machine-learning application 102 uses various latent factor models or regularized variants of the latent factor models to identify other latent factors from the visual web data and causes text queries with similar meaning to have similar latent factors for determining the other latent factors of the content items. In some embodiments, the machine-learning application 102 generates groups by clustering the initial latent factors and the other latent factors together and uses the groups to learn another feature of the content items. In this manner, the machine-learning application 102 uses a regularized iterative learning process to learn visual features of the content items. In some embodiments, iterating the process allows the machine-learning application to learn new features of the content items with improved quality. In some embodiments, iterating the process improves the accuracy with which the machine-learning application is used to learn additional features by encouraging visually similar pairs of content items to have similar latent factors.

In some embodiments, the visual web data obtained by the machine-learning application 102 (e.g., from the visual web data system 106) is sparse. For example, the visual web data includes a large amount of content item data, user data, or user behavioral data, but the web data set has missing entries when comparing all text or keyword queries to content items. For example, the visual web data includes search queries provided by users, a list of content items that resulted from the search query, and whether the users clicked the resulting content items. Unless every user views every content item that results from the user's search query, the visual web data will have missing entries where a particular user did not view a particular content item resulting from the user's search query. In some embodiments, a majority of entries in the visual web data are be missing. In some embodiments, the machine-learning application 102 uses the regularized iterative learning process to populate the missing entries in the visual web data, which improves the data set. For example, the machine-learning application probabilistically populates a number of missing entries in the web data set using the previously learned feature. As an example, the machine-learning application causes visually similar pairs of content items to have similar latent factors and the machine-learning application uses a learned feature of one content item to populate data about another content item for which data is missing. In this manner, the machine-learning application generates data derived from the web data set for populating missing entries (e.g., replacing missing entries).

In some embodiments, the machine-learning application 102 trains a machine-learning model using the learned features of the content items. In some embodiments, the trained machine-learning model allows for a variety of machine-learning applications. In some embodiments, the trained machine-learning model allows the machine-learning application 102 to use the learned features of the content items (e.g., images) to identify and recommend additional content items to a user 110. For example, the user 110 selects a content item associated with a result of a text query to view on the visual web data system 106. In response, the visual web data system 106 notifies the machine-learning application 102 of the selected content item, and in turn, the machine-learning application 102 identifies additional content items for the visual web data system 106 to present to the user 110 that are similar to the content item selected by the user. For example, the additional content items are semantically (e.g., with regard to terms associated with or describing features of the content items) or visually (e.g., with regard to physical or visual appearance of the content item) similar to the content item selected by the user 110. As another example, if the user 110 interacts with a content item (e.g., clicks on the content item), the machine-learning application 102 identifies and recommends additional content items that the user will also appreciate (e.g., based on a similarity between the additional content items and the content item clicked on by the user). As still another example, the user 110 can provide a content item as a query content item and the machine-learning application 102 can determine latent factors of the query content item and learn features of the query content item to provide other content items that are similar to the query content item to the user 110.

Although the environment 100 of FIG. 1 is depicted as having a certain number of components, in other examples, the environment 100 has any number of additional or alternative components. Further, while FIG. 1 illustrates a particular arrangement of the machine-learning application 102, client device(s) 104, visual web data system 106, and the network 108, various additional arrangements are possible. In some embodiments, the machine-learning application 102 directly communicates with the visual web data system 106, bypassing the network 108. Furthermore, while FIG. 1 illustrates the visual web data system 106 and the machine-learning application 102 as separate components on different servers, in some embodiments, the visual web data system 106 and the machine-learning application 102 are part of a single system hosted on one or more servers.

Figure 2:
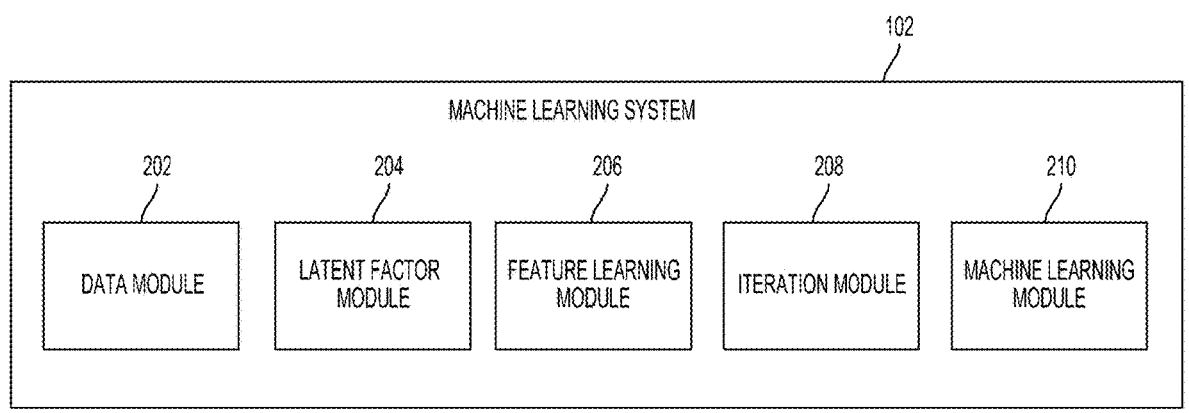
FIG. 2 is a block diagram depicting an example of the machine-learning application of FIG. 1 in accordance with one or more embodiments.

FIG. 2 is a block diagram depicting an example of the machine-learning application 102 of FIG. 1. In some embodiments, the machine-learning application 102 include various modules 202, 204, 206, 208, 210 for training and applying machine-learning to iteratively learn features of content items. The modules 202, 204, 206, 208, 210 each include one or more instructions stored on a computer-readable storage medium and executable by processors of one or more computing devices. When executed by the one or more processors, the computer-executable instructions of the machine-learning application 102 cause the computing device to perform the iterative feature learning operations described herein. In additional or alternative embodiments, the modules 202, 204, 206, 208, 210 include hardware, such as a special purpose processing device to perform a certain function or group of functions. Additionally or alternatively, the modules 202, 204, 206, 208, 210 each include a combination of computer-executable instructions and hardware.

In some embodiments, the machine-learning application 102 includes a data module 202 for receiving data. In some embodiments, the data module 202 includes instructions for causing the machine-learning application 102 to obtain data from a visual web data system (e.g., from the visual web data system 106 of FIG. 1). In some embodiments, the data is visual web data that includes content item data, user data, or user behavioral data. In some embodiments, the data is noisy and the machine-learning application 102 still accurately reflects a semantic representation between content items by applying the machine learning techniques described herein.

In some embodiments, the data module 202 includes instructions for causing the machine-learning application 102 to obtain the data from other sources. In some embodiments, the data module 202 includes instructions for causing the machine-learning application 102 to collect web data or visual web data by observing behaviors of users relative to content items.

In some embodiments, the data module 202 includes instructions for causing the machine-learning application 102 to organize, normalize, adapt, or otherwise process data obtained by the machine-learning application 102 to allow for accurate feature learning.

For example, in some embodiments, the data module 202 populates or generates at least a portion (e.g., a missing portion) of the visual web data obtained by the machine-learning application 102 to improve the machine-learning process. In one embodiment, the data module 202 includes instructions for causing the machine-learning application 102 to populate the visual web data with sample data based on the sparsity of the visual web data. In some embodiments, the data module 202 includes instructions for causing the machine-learning application 102 to use existing (e.g., non-missing) data in the visual web data to make inferences about one or more missing entries of the visual web data and populate the missing data proportionally to the structure of the existing data.

In some embodiments, the data module 202 includes instructions for causing the machine-learning application 102 to filter or remove data (e.g., outlier data) from the visual web data obtained by the machine-learning application 102. For examples, the data module 202 includes instructions for causing the machine-learning application 102 to remove outlier data above or below a threshold from the visual web data. As an example, content items with too many or too few user interactions lead to the machine-learning application 102 calculating incorrect latent factors and removing outliers improves the quality and reliability of the visual web data. Removing outliers from the visual web data also helps with the sparsity problem described above and can improve an accuracy with which a machine-learning model trained by the machine-learning application 102 (e.g., a machine-learning model trained using a feature learning module 206 as described below) can identify, classify, or provide recommendations of content items (e.g., to a user) based on learned features of content items.

In some embodiments, the machine-learning application 102 divides the visual web data based into a training data set and a testing data set. The machine-learning application 102 uses the training and testing data sets for training a machine-learning model and validating learned content item features.

In some embodiments, the machine-learning application 102 includes a latent factor module 204 for determining latent factors from content items. In some embodiments, the latent factor module 204 includes instructions for causing the machine-learning application 102 to determine the latent factors. In some embodiments, the latent factor module 204 includes instructions for causing the machine-learning application 102 to use data obtained by the machine-learning application 102 (e.g., visual web data) to determine the latent factors. For example, the machine-learning application 102 uses user behavioral data to recover hidden or latent factors of individual content items and learn features of the content items based on the recovered latent factors.

In some embodiments, the latent factor module 204 includes instructions for causing the machine-learning application 102 to apply collaborative filtering to visual web data for determining latent factors from content items. In some embodiments, the latent factor module 204 includes instructions for causing the machine-learning application 102 to use collaborative filtering to produce various types of representations, including, for example, content item latent factors (e.g., latent factors of a content item) or text query latent factors (e.g., latent factors of a user's search query, query key words, or query phrase). As an example, in some embodiments, the visual web data is in a data matrix. The machine-learning application 102 identifies or determines latent factors by running a matrix factorization using the visual web data. In some examples, matrix factorization includes dividing the visual web data into multiple matrices for determining the latent factors.

In some embodiments, when a user interacts with multiple content items, there is an increased likelihood that the multiple content items share similar features and styles to each other. In some embodiments, the latent factor module 204 includes instructions for causing the machine-learning application 102 to determine a relationship between content items. As an example, the latent factor module 204 includes instructions for causing the machine-learning application 102 to determine a neighborhood for content items, which includes content items that have common features and styles (e.g., content items that are visually or semantically similar). In some embodiments, latent factors from content items are not explicit and the latent factor module 204 includes instructions for causing the machine-learning application 102 to determine whether a latent factor exists between content items.

In some embodiments, the latent factor module 204 includes instructions for causing the machine-learning application 102 to group latent factors by clustering the latent factors. For example, the machine-learning application 102 groups together the latent factors for content items. In some embodiments, the latent factor module 204 includes instructions for causing the machine-learning application 102 to use k-means clustering to group the latent factors for content items. In some embodiments, creating groups for the content items creates a data set that is more robust to outliers when performing machine-learning. Additionally or alternatively, the latent factor module 204 includes instructions for causing the machine-learning application 102 to group together text query latent factors.

In some embodiments, the machine-learning application 102 includes a feature learning module 206 for learning a feature of a content item. In some embodiments, the feature learning module 206 includes instructions for causing the machine-learning application 102 to learn a feature of the content item based on a latent factor of the content item (e.g., a latent factor determined by the latent factor module 204). For example, the feature learning module 206 causes the machine-learning application 102 to train a machine-learning model using the latent factor determined from the content item. In some embodiments, the latent factors are used to train the machine-learning model because the latent factors reflect a semantic relationship between one or more content items. As an example, latent factors of a content item provide the ability to identify rich high-level visual and semantic information of corresponding content items. The feature learning module 206 uses the latent factors as a source of supervision for learning features of the content items.

In some embodiments, the machine-learning model includes a neural network. A neural network is a machine-learning model that uses statistical learning algorithms that are used to estimate or approximate functions that depend on a large number of inputs in a non-linear, distributed, and parallel manner. A computer learning neural network is an interconnected group of nodes, called neurons. A neural network includes input nodes, output nodes, and intermediary nodes. In some embodiments, the connections between each node are weighted with a set of adaptive weights that are tuned by a learning algorithm, and are capable of approximating non-linear functions of their inputs. In some embodiments, the machine-learning application trains a neutral network to learn how to correctly classify content items.

A non-limiting example of a neural network is a convolutional neural network (CNN). When used for image recognition, a CNN consists of multiple layers of small neuron collections that look at small portions of the input image at a time. The results of these collections are then tiled to overlap, which provides a better representation of the original image. A CNN with multiple intermediary layers is referred to as a deep convolutional neural network (DCNN).

In some embodiments, the feature learning module 206 includes instructions for causing the machine-learning application 102 to use a DCNN as a machine-learning model. For example, the machine-learning application 102 uses a DCNN to learn from the groups of latent factors in a supervised way. The machine-learning application trains the DCNN how to correctly classify future content items provided to the DCNN via machine-learning.

One non-limiting example of a DCNN includes five convolutional layers and two fully connected layers for learning a k-way DCNN classification model. From the trained DCNN, the machine-learning application 102 extracts high-level content item features from the visual web data. In other examples, the machine-learning application 102 uses any type of DCNN model as a machine-learning model. In some embodiments, the DCNN varies in size, uses any number of layers or connections, or modifies how the connections are connected.

In another example, rather than training the DCNN with the groups of latent factors of content items, the feature learning module 206 includes instructions for causing the machine-learning application 102 to train the DCNN by applying a regression function directly from the content items directly based on latent factors of the content items. By applying the regression function, the machine-learning application 102 defines a continuous mapping between the content items and latent factors rather than using clustering to train the DCNN. For example, if the content items are images, the machine-learning application 102 uses the image pixels in a regression function to train the DCNN.

Regardless of how the machine-learning application 102 trains a neural network or if the machine-learning application 102 employs a DCNN, the machine-learning application 102 uses a neural network to extract features related to the content items or query terms. For example, if the machine-learning application 102 trains a neural network using content item latent factors, the machine-learning application 102 extracts content item features from the trained neural network. Once extracted, the learned features reveal properties corresponding to the visual web data including, for example, properties of the content items.

In some embodiments, the feature learning module 206 includes instructions for causing the machine-learning application 102 to optimize or otherwise improve the efficiency of the machine-learning process through training and testing. For example, the machine-learning application 102 divides the visual web data into a training data set and a testing data set (e.g., using the data module 202). Using the training data set, the machine-learning application 102 trains and refines a neural network's ability to correctly perform machine-learning. Further, using the training data set, the machine-learning application 102 performs validation to determine an accuracy of the neural network in classifying content items. For example, the machine-learning application 102 validates results of the neural network using root-mean-square error (RMSE) measurements, and based on the results, the machine-learning application 102 refines the training of the neural network to improve future outcomes.

In some embodiments, the feature learning module 206 includes instructions for causing the machine-learning application 102 to use the testing data set to measure and refine a neural network to improve machine-learning. For example, the machine-learning application 102 provides a content item from the testing set to the trained neural network and analyzes the results. As an example, when a content item from the testing data set is input into the neural network, the neural network identifies the content items from the training data set that are the nearest neighbors in latent factor space. In other words, the neural network identifies content items from the training data set that share similar semantics and contexts.

In some embodiments, the feature learning module 206 includes instructions for causing the machine-learning application 102 to compare the input content items from the testing set with corresponding nearest neighbors (e.g., other visually similar content items) identified from the training data set to test the effectiveness of the learned features. For example, the machine-learning application 102 analyzes the cosine similarities and/or the coarse and fine level semantics proximities between the two data sets to determine if the cosine values are within a threshold range of each other. Additionally or alternatively, a user manually compares the features and styles of the two data sets and indicates to the machine-learning application 102 which identified content items from the training data set are similar to the corresponding query content items from the testing data set.

In some embodiments, the feature learning module 206 learns features of content items based on visual web data. For example, the feature learning module 206 uses latent factor models, natural language understanding, and deep convolutional neural networks for learning a visual feature using image search engine data. In another example, the feature learning module 206 uses collaborative filtering based on singular value decomposition to improve machine-learning and, as a result, improves its ability to identify and recommend content items in response to query content items.

In some embodiments, the feature learning module 206 includes instructions for causing the machine-learning application 102 to train the machine-learning model using the latent factors and extract features from the trained machine-learning model. For example, as a machine-learning model is trained, the machine-learning model begins understand how to correctly classify content items. In some embodiments, by training the machine-learning model with latent factors of the content items, the machine-learning model is used to correctly classify the content items. As an example, feature learning module 206 includes instructions for causing the machine-learning application 102 to use groups of content items (e.g., groups of content items created using the latent factor module 204) to train the machine-learning model to recognize content item features (e.g., learned latent factors).

In some embodiments, the feature learning module 206 includes instructions for causing the machine-learning application 102 to refine the machine-learning model through training and testing.

In some embodiments, the machine-learning application 102 includes an iteration module 208 for causing the machine-learning application 102 to use a learned feature of the content items to learn additional features of the content items. For example, the iteration module 208 identifies additional latent factors of the content items using the visual web data and a previously learned feature of the content item (e.g., a feature of the content item learned using the feature learning module 206).

In some embodiments, the machine-learning application 102 includes the previously learned feature of the content items in the visual web data. The machine-learning application 102 then formulates a joint cost function or decomposes the visual web data and causes text queries with similar meanings to have similar latent factors for determining additional latent factors of the content items. In some examples, the machine-learning application optimizes the joint cost function via a stochastic gradient descent. In some embodiments, the machine-learning application 102 uses the additional latent factors of the content items to learn additional features of the content items (e.g., using the feature learning module 206). For example, the machine-learning application 102 generates groups (e.g., using the latent factor module 204) by clustering previously learned latent factors and additional latent factors and uses groups to learn additional features of the content items. In this manner, the machine-learning application 102 uses a regularized iterative learning process to learn visual features of the content items.

In some embodiments, the machine-learning application 102 includes a machine-learning module 210 for using a trained machine-learning model (e.g., the machine-learning model trained using the feature learning module 206) to reveal properties of a content item. In some embodiments, the machine-learning module 210 includes instructions for causing the machine-learning application 102 to use the machine-learning model to reveal properties of content items. As an example, the machine-learning module 210 includes instructions for causing the machine-learning application 102 to recognize features of a content item (e.g., learned features of the content item). In some embodiments, the machine-learning application 102 uses the learned features to identify, classify, or provide recommendations of content items (e.g., to a user).

For example, the machine-learning application 102 receives a query content item (e.g., via user input). In some embodiments, the query content item is an image. In some embodiments, the machine-learning module 210 includes instructions for causing the machine-learning application 102 to recommend similar images based on learned features identified in the query image as well as learned features of the recommended images. In some embodiments, the machine-learning module 210 includes instructions for causing the machine-learning application 102 to classify the query image and output the classification (e.g., to a user). In some embodiments, the machine-learning module 210 includes instructions for causing the machine-learning application 102 to identify a number of content items having features or styles that are similar to the query content item.

In some embodiments, the machine-learning module 210 includes instructions for causing the machine-learning application 102 to use features of content items (e.g., features of content items learned by the machine-learning application 102) to identify, classify, or provide recommendations of content items from visual web data or other sources. As an example, the machine-learning application 102 learns features from visual web data and uses the learned features to perform one or more machine-learning applications on a set of data or content items that are not part of the visual web data. In some embodiments, the machine-learning module 210 includes instructions for causing the machine-learning application 102 to learn features of content items and use the learned features to perform one or more machine-learning applications on visual web data.

Figure 3:
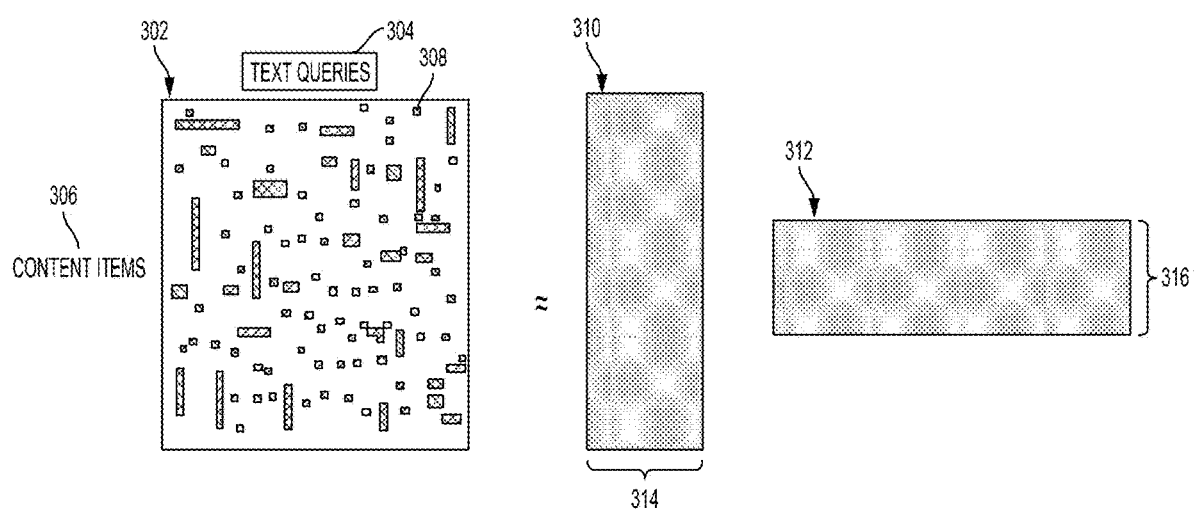
FIG. 3 is an example of a user behavioral matrix used by a machine-learning application for iteratively learning features of content items in accordance with one or more embodiments.

FIG. 3 is an example of a user behavioral matrix 302 used by the machine-learning application 102 for iteratively learning features of content items. In some embodiments, the user behavioral matrix 302 includes visual web data. In some embodiments, the machine-learning application 102 generates the user behavioral matrix 302 using visual web data received from a visual web data system (e.g., the visual web data system 106 of FIG. 1). In some embodiments, the machine-learning application 102 obtains the user behavioral matrix 302 from any source that captures user behavioral data related to content items and provides the user behavioral data to the machine-learning application as visual web data.

The columns in the user behavioral matrix 302 represent text queries 304 and the rows represent content items 306. In the example depicted in FIG. 3, each shaded square in the user behavioral matrix 302 represents a populated matrix entry or populated entry (e.g., populated entry 308). In some embodiments, the populated entry 308 indicates that a user that provided the text query in a corresponding column interacted with the content item of a corresponding row. For example, if the first entry in a first row and first column of the user behavioral matrix 302 is the populated entry 308, then a user providing the first text query in the first column interacted with (e.g., clicked on) the content item in the first row.

In the example depicted in FIG. 3, the user behavioral matrix 302 is sparse. For example, the user behavioral matrix 302 includes more missing entries (e.g., where a user providing a text query did not interact with a content item) than populated entries. Further, as shown in the user behavioral matrix 302, columns that include a larger number of populated entries indicate a user interacts with a number of different content items associated with text queries provided by the user. Likewise, rows that include a number of populated entries 308 indicate a popular content item (e.g., the content item is viewed by a number of different users providing various text queries).

In some embodiments, the machine-learning application 102 determines latent factors of content items based on the user behavioral matrix 302. For example, the machine-learning application 102 decomposes the user behavioral matrix 302 (e.g., factorizes the user behavioral matrix 302 into a product of matrices) to identify latent factors of various content items included in the user behavioral matrix 302. In the example depicted in FIG. 3, the machine-learning application 102 factorizes or divides the user behavioral matrix 302 into matrices 310 and 312. The matrix 310 includes content item latent factors. The matrix 312 includes text query latent factors. In some embodiments, each matrix 310, 312 has a respective dimensionality 314, 316. In some embodiments, the machine-learning application 102 factors or decomposes the user behavioral matrix 302 such that [user behavioral matrix 302]=[content item latent factors matrix 310]×[text query latent factors matrix 312].

In some embodiments, the machine-learning application 102 determines latent factors of content items from the content item latent factors matrix 310. In some embodiments, the machine-learning application 102 determines text query latent factors from text query latent factors matrix 312. In some embodiments, the machine-learning application 102 uses the content item latent factors or text query latent factors to learn features of the content item. For example, the machine-learning application 102 generates groups (e.g. using the latent factor module 204 of FIG. 2)

from the content item latent factors by clustering content item latent factors. In some examples, the machine-learning application uses the groups to learn a feature of the content item.

In some embodiments, the machine-learning application 102 iterates the process to learn additional features of the content item. For example, the machine-learning application 102 learns a first feature of the content item using first content item latent factors. In some embodiments, the machine-learning application 102 includes the first feature in user behavioral matrix 302. The machine-learning application 102 then decomposes the user behavioral matrix 302 that includes the first feature of the content item in substantially the same manner as described above. In some embodiments, the machine-learning application 102 determines second content item latent factors by decomposing the user behavioral matrix 302 that includes the first feature of the content item. In some embodiments, the machine-learning application 102 learns a second feature of the content item by generating groups that include the first and second content item latent factors.

In some embodiments, the machine-learning application uses the groups to train a machine-learning model. In some embodiments, the machine-learning application extracts features of content items from the machine-learning model after training the machine-learning model. The machine-learning application uses the learned features of the content items in various machine-learning applications.

Figure 4:
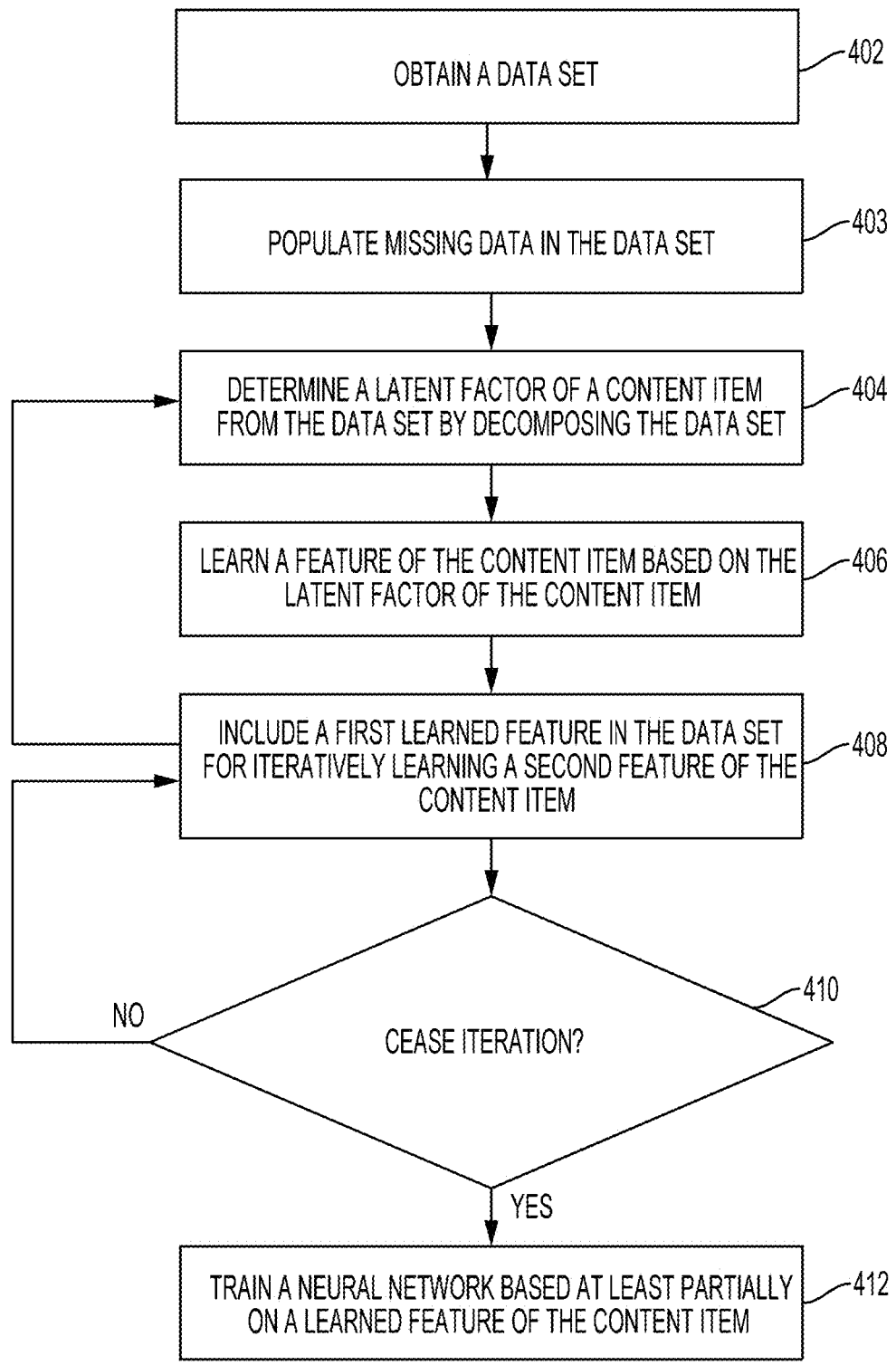
FIG. 4 is a flow chart depicting an example of a process for regularized iterative collaborative feature learning using unsupervised visual web data in accordance with one or more embodiments.

FIG. 4 is a flow chart depicting an example of a process for regularized iterative collaborative feature learning using unsupervised visual web data.

In block 402, a data set is obtained. In some embodiments, the data set includes visual web data and is obtained by a machine-learning application (e.g., using the data module 202 of FIG. 2). The machine-learning application obtains the data set from a visual web data system (e.g., the visual web data system 106 of FIG. 1). In some embodiments, the data set is a user behavioral matrix (e.g., the user behavioral matrix 302 of FIG. 3). The data set includes data associated with a text query provided by a user and a content item (e.g., an image). In some embodiments, the data set includes implicit behavioral correlations between a user and a content item. In some embodiments, obtaining the data set includes identifying user behavioral data from the visual web data system in relation to content items in the visual web data system. As an example, the data set includes data indicating that a user clicked on a content item that resulted from a text query provided by the user.

In some embodiments, in block 402, the machine-learning application filters or removes data (e.g., outlier data) from the data set. For example, the machine-learning application removes outlier data above or below a threshold from the data set. As an example, content items with too many or too few user interactions lead to the machine-learning application calculating incorrect latent factors and removing outliers improves the quality and reliability of the visual web data. Removing outliers from the visual web data also helps with the sparsity problem described above.

In some embodiments, the machine-learning application removes content items that do not satisfy a minimum or maximum threshold value. As an example, the machine-learning application removes content items that have ten user interactions (e.g., views or clicks) or less or that have over 20,000 user interactions. In some embodiments, the machine-learning application uses a top percentage or a bottom percentage to determine which content items to remove from the data set. For example, the machine-learning application removes the top 5% of content items in the data set (e.g., content items that have the top 5% of user interactions associated with them) or remove the bottom 10% of content items that have the fewest number of user interactions. In some embodiments, the machine-learning application removes a predetermined number of content items from the top or bottom of the data set. For example, the machine-learning application removes the fifteen lowest content items (e.g., fifteen content items having the lowest number of user interactions) from the data set. As still another example, the machine-learning application removes all content items associated with the fifteen lowest number of user interactions. In some embodiments, the machine-learning application removes data about text queries from the data set.

In some embodiments, in block 402, the machine-learning application divides the data set obtained by the machine-learning application (e.g., divides visual web data into multiple data sets). As an example, the machine-learning application divides the data set into two portions for training and testing. For example, the machine-learning application splits the majority of the data set into a training portion and the remainder of the data set into a testing portion.

In block 403, missing data in the data set is populated. In some embodiments, the machine learning-application populates the missing data (e.g., using the data module 202 of FIG. 2).

In some embodiments, the data set obtained by the machine-learning application (e.g., in block 402) is sparse (e.g., if over a certain percentage of the entries in the data set are missing). As an example illustrating why the data set is generally sparse, consider a data set that includes 100 text queries provided by users and 100 content items. To fully populate the data set, each user providing the text query would need to interact with each of the content items. If, however, each user on average only viewed 20 content items, the data set would be 80% empty. In this case, the data set would include 2,000 content item interactions, but 8,000 missing interactions. In other words, for every content item with which a user interacted, the data set includes a data point, and for every content item with which the user did not interact, the data set is missing a data point. Thus, if the data set includes a data point each time a user viewed a content item, the missing data would represent where the user did not view a content item. In some embodiments, the machine-learning application determines the sparsity of the data set by comparing the amount of populated data to the amount of missing data in the data set.

In some embodiments, in block 403, the machine-learning application identifies one or more missing entries or data in the data set. In some embodiments, the machine-learning application populates the one or more missing entries in the data set with positive or negative sample indications. For example, in one embodiment, the machine-learning application populates the data set with sample data based on the sparsity of the data set. As an example, the machine-learning application determines that the data set is sparse when the missing or empty data reaches a threshold percentage of the total data. For example, the machine-learning application determines that the data set is sparse when 30%, 50%, 60%, 75%, 80%, or 90% of the data in the data set is missing. Alternatively, the machine-learning application determines the data set is sparse when over 99% of the data in the data set is missing. If the machine-learning application determines that data set is sparse, the machine-learning application populates a portion of the missing data. For example, in some embodiments, the machine-learning application populates missing data until the percentage of missing data in the data set drops below a threshold value. For example, if the threshold for sparsity is 95%, the machine-learning application populates missing data until less than 95% of data is missing in the data set.

In some embodiments, populating missing entries includes adding positive or negative sample data to the data set based on the data in the data set. For example, in some embodiments, the data set obtained by the machine-learning application has structure even when the data set is sparse. In some embodiments, the machine-learning application uses the structure to overcome the sparsity and noise issues by generating data that is derived from the data in the data set for populating the missing entries. For example, with some content items, it is inferred that if two content item have similar features (e.g., two images are visually similar), then the two content items will be equally viewed, liked, appreciated, commented on, etc., by users. Using this inference, the machine-learning application populates missing data by determining a similarity of content items and adding positive or negative data to missing entries for content items based on the similarity. For example, if a content item has a missing entry, the machine-learning application determines a similarity of the content item to another content item that does not have a missing entry and populates the missing entry (e.g., add positive data for the missing entry) based on the similarity between the content items. In this manner, the machine-learning application generates derived data based on existing data in the data set to populate missing data in the data set.

In some embodiments, the machine-learning application populates missing data in the data set by using sample data. Sample data includes positive or negative data. In some embodiments, the machine-learning application estimates the sample data and populates missing data proportionally to the popularity of each content item. In some embodiments, the popularity of a content item is the measure of how much exposure the content item receives from users. In some embodiments, the machine-learning application adds positive or negative sample data to popular or unpopular content items.

In some embodiments, the machine-learning application increases the quality and robustness of the data set by populating missing data in the data set, which improves the sparsity of the data and improves the machine-learning.

In block 404, a latent factor of a content item from the data set is determined by decomposing the data set. In some embodiments, the machine-learning application decomposes the data set to determine the latent factor of the content item in the data set. For example, the machine-learning application factorizes the data set into a content item latent factors matrix (e.g., the content item latent factors matrix 310 of FIG. 3) and a text query latent factors matrix (e.g., the text query latent factors matrix 312 of FIG. 3). As an example, each click between a text query and search engine is denoted as follows:

$$(q_i, p_j, C_{ij})$$

where $q_i$ is a query phrase, $p_j$ is an image, and $C_{ij} \in \{0,1\}$ is a binary indicator indicating whether $p_j$ is clicked by a user who searched for $q_i$. In some embodiments, many such triplets of data are constantly accumulated to form at least a portion of the data set obtained by the machine-learning application 102. The data set is obtained in a matrix format that includes text queries and images as row and column indices respectively. The matrix containing the data set is denoted as C. The matrix includes data related to a query phrase provided by a user, a content item, and whether the user providing the query phrase clicked on the content item. In some embodiments, if a click exists between $q_i$ and $p_j$, the corresponding entry in matrix $C_{ij}$ will be one. In other examples, if a click does not exist between $q_i$ and $p_j$, the corresponding entry in in matrix $C_{ij}$ will be zero.

In some embodiments, the machine-learning application runs matrix factorization with the following equation:

$$|(|C-XQ|)|+\lambda(\|X\|+\|Q\|)$$

where X and Q represent latent factors for the content items and query phrases respectively and $\lambda$ is a weighted factor for X and Q. In some embodiments, the first term $|(|C-X Q|)|$ causes an inner product of X and Q to reconstruct C. In some embodiments, the term $\lambda \, (\|X\|+\|Q\|)$ is a regularizer to prevent X and Q from overfitting. In some embodiments, the machine-learning application learns or determines a first latent factor for the content item based on the equation above by using the latent factor module 204 of FIG. 2). The first latent factor includes a content item latent factor or a text query latent factor.

In block 406, a feature of the content item is learned based on the latent factor of the content item. In some embodiments, the machine-learning application groups content item latent factors (e.g., the content item latent factor identified in block 404) by clustering the content item latent factors. In some embodiments, the machine-learning application applies k-means clustering to the content item latent factors to group the content item latent factors. In some embodiments, the machine-learning application uses the group of content item latent factors to learn the feature of the content item.

In some embodiments, in block 406, the machine-learning application trains a machine-learning model (e.g., by using the feature learning module 206 of FIG. 2) using the group of content item latent factors. In some embodiments, training the machine-learning application includes training a neural network using the group of content item latent factors. In some embodiments, training the machine-learning model includes using supervisory training to train the neural network.

In some embodiments, in block 406, the feature of the content item is extracted from the machine-learning model. In some embodiments, the machine-learning application extracts or learns the feature of the content items from the machine-learning model. In some embodiments, extracting the feature of the content items from the machine-learning model includes extracting features of the content items from the neural network trained using the group of content item latent factors.

In block 408, a first learned feature of the content item (e.g., the feature of the content item learned in block 406) is included in the data set (e.g., the data set obtained in block 402) for iteratively learning a second feature of the content item. In some embodiments, the machine-learning application includes the first learned feature of the content item in the data set. In some embodiments, the first learned feature of the content item is used as an initial feature for decomposing the data set, which improves the ability of the machine-learning application to identify content item latent factors or features of the content items.

In some embodiments, the machine-learning application iteratively learns a second feature of the content item by including the first learned feature of the content item into the data set for populating a missing entry in the data set, which can decrease a sparsity of the data set. In some embodiments, the machine-learning application iteratively learns the second feature of the content item by determining a second latent factor of a content item from the data set that includes the learned feature by decomposing the data set (e.g., by returning to block 404). For example, the machine-learning application decomposes the data set that includes the first learned feature by minimizing the following cost function:

$$\|C-XQ\|+\lambda(\|X\|+\|Q\|)+\rho\Sigma_{(ii,jj)\in N}\|Q_{ii}-Q_{jj}\|$$

where C is the matrix as described above and includes the first learned feature, the term $\|C-XQ\|$ causes the inner product of X and Q to reconstruct C, and the term $\lambda(\|X\|+\|Q\|)$ is a regularizer that prevents X and Q from overfitting. The term $\beta\Sigma_{(ii,jj)\in N}\|Q_{ii}-Q_{jj}\|$ is a natural language regularizer. In some embodiments, the term $\beta\Sigma_{(ii,jj)\in N}\|Q_{ii}-Q_{jj}\|$ causes text queries with similar meaning to have similar latent factors. $\|Q_{ii}-Q_{jj}\|$ is a difference between the latent factor of $ii^{th}$ and $jj^{th}$ text query, and $(ii, jj)\in N$ means $ii^{th}$ and $jj^{th}$ content are similar neighbors of each other. In some embodiments, the machine-learning application learns a second latent factor for the content item based on the equation above. The second latent factor includes a content item latent factor or a text query latent factor.

In some embodiments, the machine-learning application iteratively learns the second feature of the content item by iterating the operations described with respect to blocks 406 and 408 described above. For example, the machine-learning application groups the content item latent factors in the first and second latent factors (e.g., the content item latent factors identified in blocks 404 using the two equations above) by clustering the content item latent factors (e.g., by iterating block 406). In some embodiments, the machine-learning application applies k-means clustering to the content item latent factors to group the content item latent factors. In some embodiments, the machine-learning application uses the group of content item latent factors to learn a feature of the content item (e.g., by iterating block 408). In this manner, the machine-learning application 102 uses a regularized iterative learning process to learn visual features of the content items. In some embodiments, iterating the process allows the machine-learning application to learn new features of the content items with improved quality. In some embodiments, the iterating the process improves the accuracy with which the machine-learning application is used to learn additional features by encouraging visually similar pairs of content items to have similar latent factors.

In block 410, the machine-learning application determines whether to cease (e.g., stop) the process for regularized iterative collaborative feature learning using unsupervised visual web data. In some embodiments, the machine-learning application ceases the process for regularized iterative collaborative feature learning when a quality of the learned features of the content item stops improving. As an example, the machine-learning application learns a feature of an image (e.g., the first feature learned in block 406 or the second feature learned in block 408) and executes one or more operations for classifying the image or performing object recognition on the image to determine an accuracy of the learned features. The machine-learning application can determine whether to cease the process based on the accuracy of the learned features.

In some embodiments, the machine-learning application continues to iterate the process if the machine-learning application determines that the process for regularized iterative collaborative feature learning using unsupervised visual web data should not cease. For example, the machine-learning application includes another learned feature in the data set for iteratively learning an additional feature of the content item (e.g., in block 408) in response to determining that the process should not cease.

In block 412, a neural network is trained based at least partially on a learned feature of the content item (e.g., the first or second learned feature of the content items). In some embodiments, training the neural network includes training a machine-learning model that includes the neural network using the learned features of the content items.

In some embodiments, the machine-learning application uses the machine-learning model that includes the neural network for a variety of machine-learning applications. As an example, a user provides a content item (e.g., an image) to the machine-learning application and the machine-learning application classifies the image, presents similar images (e.g., similar images from the web data system) to the user, or recommends one or more additional images to the user that are of interest to the user. In some embodiments, the machine-learning application identifies other users who have interests in images similar to the image provided by the user.

Figure 5:
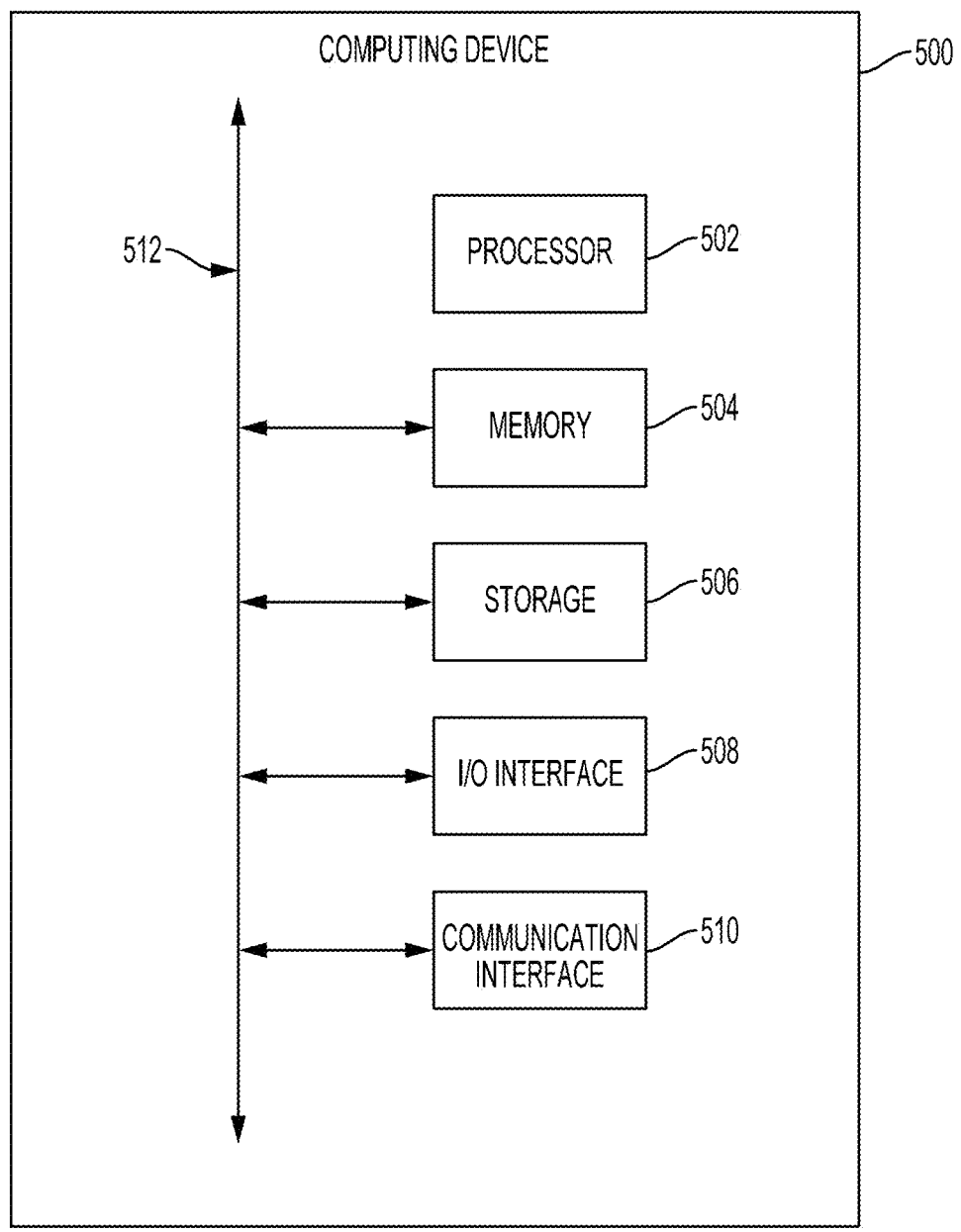
FIG. 5 is a block diagram of an exemplary computing device used for regularized iterative collaborative feature learning using unsupervised visual web data in accordance with one or more embodiments

FIG. 5 is a block diagram of an exemplary computing system 500 used for regularized iterative collaborative feature learning using unsupervised visual web data in accordance with one or more embodiments. In some embodiments, one or more computing devices, such as the computing system 500 implement the machine-learning application. In the example depicted in FIG. 5, the computing system 500 includes a processor 502, memory 504, a storage device 506, an I/O interface 508, and a communication interface 510, which is communicatively coupled by way of a communication infrastructure 512. While an exemplary computing system 500 is shown in FIG. 5, the components illustrated in FIG. 5 are not intended to be limiting. In some embodiments, additional or alternative components are used. Furthermore, in some embodiments, the computing system 500 includes fewer components than those shown in FIG. 5. Components of the computing system 500 shown in FIG. 5 will now be described in additional detail.

In some embodiments, the processor 502 includes hardware for executing instructions, such as those making up a computer program. As an example and not by way of limitation, the processor 502 retrieves or fetches the instructions from an internal register, an internal cache, the memory 504, or the storage device 506. The processor 502 then decodes and executes the instructions after retrieving the instructions. In some embodiments, the processor 502 includes one or more internal caches for data, instructions, or addresses. As an example and not by way of limitation, the processor 502 includes one or more instruction caches, one or more data caches, and one or more translation lookaside buffers (TLBs). In some embodiments, instructions in the instruction caches are copies of instructions in the memory 504 or the storage device 506.

In some embodiments, the memory 504 is used for storing data, metadata, and programs for execution by the processor (s). In some embodiments, the memory 504 includes one or more of volatile and non-volatile memories, such as Random Access Memory ("RAM"), Read Only Memory ("ROM"), a solid state disk ("SSD"), Flash, Phase Change Memory ("PCM"), or other types of data storage. In some embodiments, the memory 504 is internal or distributed memory. In some embodiments, the memory includes various modules for iteratively learning features of content items. For example, in some embodiments, the memory 504 includes a machine-learning application (e.g., the machine-learning application 102 of FIGS. 1-2). In some embodiments, the memory 504 includes various modules (e.g., the modules 202, 204, 206, 208, 210 of FIG. 2).

The storage device 506 includes storage for storing data or instructions. As an example and not by way of limitation, the storage device 506 includes a non-transitory storage medium described above. In some embodiments, the storage device 506 includes a hard disk drive (HDD), a floppy disk drive, flash memory, an optical disc, a magneto-optical disc, magnetic tape, or a Universal Serial Bus (USB) drive or a combination of two or more of these. In some embodiments, the storage device 506 includes removable or non-removable (or fixed) media, where appropriate. In some embodiments, the storage device 506 is internal or external to the computing system 500. In particular embodiments, the storage device 506 is non-volatile, solid-state memory. In other embodiments, the storage device 506 includes read-only memory (ROM). Where appropriate, this ROM is mask programmed ROM, programmable ROM (PROM), erasable PROM (EPROM), electrically erasable PROM (EEPROM), electrically alterable ROM (EAROM), or flash memory or a combination of two or more of these.

The I/O interface 508 allows a user to provide input to, receive output from, and otherwise transfer data to and receive data from the computing system 500. In some embodiments, the I/O interface 508 includes a mouse, a keypad or a keyboard, a touch screen, a camera, an optical scanner, network interface, modem, other known I/O devices or a combination of such I/O interfaces. In some embodiments, the I/O interface 508 includes one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 508 is configured to provide graphical data to a display for presentation to a user. In some embodiments, the graphical data is representative of one or more graphical user interfaces and/or any other graphical content to serve a particular implementation.

The communication interface 510 includes hardware, software, or both. In some embodiments, the communication interface 510 provides one or more interfaces for communication (such as, for example, packet-based communication) between the computing system 500 and one or more other computing devices or networks. As an example and not by way of limitation, the communication interface 510 includes a network interface controller (NIC) or network adapter for communicating with an Ethernet or other wire-based network or a wireless NIC (WNIC) or wireless adapter for communicating with a wireless network, such as a WI-FI.

Additionally or alternatively, the communication interface 510 facilitates communications with an ad hoc network, a personal area network (PAN), a local area network (LAN), a wide area network (WAN), a metropolitan area network (MAN), or one or more portions of the Internet or a combination of two or more of these. One or more portions of one or more of these networks are wired or wireless. As an example, the communication interface 510 facilitates communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, the communication interface 510 facilitates communications various communication protocols. Examples of communication protocols include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

In some embodiments, the communication infrastructure 512 includes hardware, software, or both that couples components of the computing system 500 to each other. As an example and not by way of limitation, the communication infrastructure 512 includes an Accelerated Graphics Port (AGP) or other graphics bus, an Enhanced Industry Standard Architecture (EISA) bus, a front-side bus (FSB), a HYPER-TRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

The following examples will serve to further illustrate the present invention without, at the same time, however, constituting any limitation thereof. On the contrary, it is to be clearly understood that resort is to be had to various embodiments, modifications and equivalents thereof which, after reading the description herein, suggest themselves to those skilled in the art without departing from the spirit of the invention. During the studies described in the following examples, conventional procedures were followed, unless otherwise stated. Some of the procedures are described below for illustrative purposes.

EXAMPLES

In some embodiments, a machine-learning application described herein can be used for various machine learning applications, including, for example, classifying various images based on learned features of the images or other content items. In one example for testing these embodiments, image classifications results from a machine-learning application (e.g., the machine learning application 102 of FIG. 2) are measured against standard benchmarks (e.g., benchmarks for object class classification and visual style classification). For illustrative purposes, Caltech256 is used for the example of object class classification. This example involves image search log data gathered from a one-year click log of an image search engine. The example dataset includes 221 million clicks, over 40 million images, and 73 million various query phrases. The query set covers a wide variety of entities, including, for example, objects (e.g., a chair), celebrities (e.g., President Obama), and scenes (e.g., a kitchen). In some embodiments, the images are varied and included clean images, such as centered objects with a clean background, or noisy images, such as a cluttered street scene. In this example, only part of the data set was used. For example, a smaller subset of the data, which contained 23 million triplets, 11 million queries and 1 million images, was used. A larger subset of the data ("Log 5M set") was also used, which contained 80 million triplets, 20 million queries and 5 million images.

Figure 6:
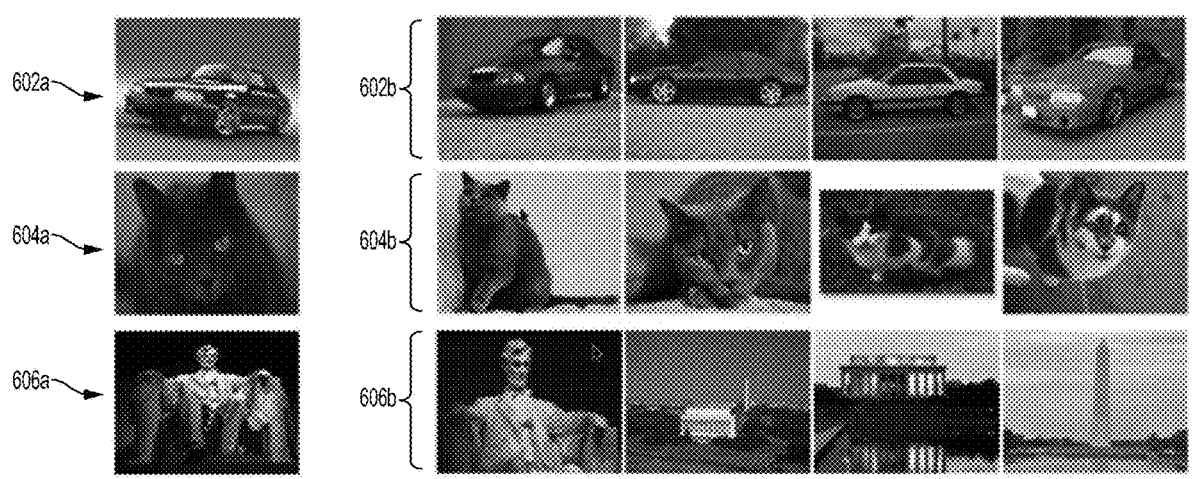
FIG. 6 shows an example of image classification results from a machine-learning application in accordance with one or more embodiments.

First, a matrix decomposition (e.g., using the latent factor module 204 of the machine learning system 102 FIG. 2) was run on the smaller subset with 1 million images for hyperparameter validation. The matrix decomposition was run for identifying latent factors of the images for learning features of the various images. The properties of the learned latent factors were also inspected. The nearest neighbors for images as well as query phrases in the latent factor space were examined. For example, several images were randomly sampled as selected seeds and each was run on the 1 million-image set. In some embodiments, the machine learning-application is able to recognize or learn features of the various images and classify the images based on the learned features. For example, FIG. 6 shows an example of image classification results from the machine-learning application of this example. FIG. 6 indicates visual and semantic consistency between seed content items (e.g., images in the first column) and neighbors (e.g., images in the following columns in a row. In some examples, the seed content items are query images (e.g., images provided by a user to the machine-learning application). In the example depicted in FIG. 6, query images 602*a*, 604*a*, 606*a* and corresponding neighbors 602*b*, 604*b*, 606*b* are visually and semantically similar. As an example, query image 602*a* shows an image of a car and the corresponding nearest neighbor images 602*b* show image of a similar car.

After choosing the best hyperparameters, the test was run on the Log 5M set. The test was run on the entire pipeline, including latent factor discovery with matrix decomposition and feature learning with DCNN. The learned feature was used as a generic image descriptor and Caltech256 was chosen as the benchmark for image recognition. The systems and methods described herein, when compared to features trained with the ImageNet dataset, which is a dataset labeled manually by Amazon Mechanic Turkers, provided improved accuracy as compared to the features trained with the ImageNet dataset. In some aspects, the systems and methods described herein provide improved accuracy by using previously learned features of images to populate an initially sparse data set, which can provide a more robust data set for machine learning. The systems and methods can also learn features of the content items based on the populated data, which improves the accuracy with which the machine-learning application learns additional features of various images.

The DCNN trained on Log 5M set was used as a pre-trained model and fine-tuned on ImageNet training dataset, and the fine-tuned model was tested on ImageNet's validation set. Following the evaluation convention on ImageNet challenge, a top-5 classification accuracy was reported. For example, the pretrained model of the current disclosure achieves 83.3% accuracy, while a model with the same DCNN only trained on ImageNet data achieves 81.9%. These results provide, without limitation, examples of the increased accuracy provided by the and embodiments described herein.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A method for iterative collaborative feature learning usable for accurately matching image content in queries to corresponding image results, the method comprising:
   obtaining, by a processor, a data set that includes data indicating whether a user providing a text query clicked on a content item resulting from a search of the text query;
   populating, by the processor, at least one missing data entry in the data set;
   determining, by the processor, a first latent factor of the content item from the data set, wherein the first latent factor includes information about a feature of the content item;
   learning, by the processor, a first feature of the content item based on the first latent factor;
   modifying the data set by populating an additional missing data entry in the data set with the first feature;
   iteratively learning, by the processor, a second feature of the content item, wherein each iteration comprises:
      decomposing the modified data set to identify a second latent factor of the content item based on the modified data set, wherein the decomposing includes factorizing a data matrix that includes the modified data set, the data matrix being decomposed into a content item latent factors matrix and a text query latent factors matrix,
      wherein the second latent factor of the content item is learned based on a difference between additional latent factors of multiple text queries indicated by the text query latent factors matrix,
      grouping the first latent factor and the second latent factor into a cluster,
      learning the second latent factor of the content item based on the cluster, and
      learning the second feature of the content item based on the second latent factor; and
   training a neural network usable for matching content items in queries by learning to classify a plurality of content items based at least partially on the first or the second feature of the content item.

2. The method of claim 1, further comprising:
   receiving, by the processor, data associated with a query content item;
   determining, by the processor, a latent factor of the query content item;
   learning, by the processor, a feature of the query content item; and
   outputting, by the processor, a recommendation indicating a recommended content item, wherein the recommended content item is similar to the query content item.

3. The method of claim 1, further comprising:
   determining, by the processor, whether the user providing the text query clicked on the content item resulting from the search of the text query; and
   outputting, by the processor, a recommendation to the user indicating a recommended content item, wherein the recommended content item is similar to the content item clicked on by the user.

4. The method of claim 1, wherein populating the at least one missing data entry in the data set includes:
   determining, by the processor, an amount of missing data in the data set;

generating, by the processor, derived data for the data set based on the amount of missing data being below a threshold amount of missing data; and populating, by the processor, the at least one missing data entry in the data set by replacing the at least one missing data entry with the derived data.

5. The method of claim 1, wherein determining the second latent factor of the content item includes:

decomposing, by the processor, the data matrix into a plurality of data matrices that include data associated with the first latent factor or the second latent factor, wherein the decomposed data matrix includes the first feature.

6. The method of claim 1, further comprising:

grouping, by the processor, the first latent factor and the second latent factor into a plurality of clusters and wherein learning the first feature or the second feature of the content item includes learning the first feature or the second feature based on the plurality of clusters.

7. The method of claim 1, wherein obtaining the data set includes:

determining by the processor, that outlier data from the data set includes data in the data set that is above or below a threshold associated with an accuracy with which the neural network classifies the plurality of content items; and removing, by the processor, the outlier data from the data set based on the data in the data set being above or below the threshold.

8. A system comprising:

a processing device; and a non-transitory computer-readable medium communicatively coupled to the processing device, wherein the processing device is configured to perform operations comprising:

obtaining a data set that includes data indicating whether a user providing a text query clicked on a content item resulting from a search of the text query;

populating at least one missing data entry in the data set;

determining a first latent factor of the content item from the data set, wherein the first latent factor includes information about a feature of the content item;

learning a first feature of the content item based on the first latent factor;

modifying the data set by populating an additional missing data entry in the data set with the first feature;

iteratively learning a second feature of the content item, wherein each iteration comprises:

decomposing the modified data set to identify a second latent factor of the content item based on the modified data set, wherein the decomposing includes factorizing a data matrix that includes the modified data set, the data matrix being decomposed into a content item latent factors matrix and a text query latent factors matrix, wherein the second latent factor of the content item is learned based on a difference between additional latent factors of multiple text queries indicated by the text query latent factors matrix, grouping the first latent factor and the second latent factor into a cluster, learning the second latent factor of the content item based on the cluster, and learning the second features of the content item based on the second latent factor; and training a neural network usable for matching content items in queries by learning to classify a plurality of content items based at least partially on the first or the second feature of the content item.

9. The system of claim 8, wherein the processing device is further configured to train the neural network to:

learn features of a plurality of content items and classify the plurality of content items based on the learned features.

10. The system of claim 8, wherein the processing device is further configured to:

receive data associated with a query content item;

determine a latent factor of the query content item;

learn a feature of the query content item; and output a recommendation indicating a recommended content item, wherein the recommended content item is similar to the query content item.

11. The system of claim 8, wherein the processing device is further configured to:

determine an amount of missing data in the data set;

generate derived data for the data set based on the amount of missing data being below a threshold amount of missing data; and populate the at least one missing data entry in the data set by replacing the at least one missing data entry with the derived data.

12. The system of claim 8, wherein the processing device is further configured to:

train the neural network to learn features of a plurality of content items and classify the plurality of content items based on the learned features; and remove outlier data from the data set to improve an accuracy with which the trained neural network classifies the plurality of content items, wherein outlier data includes data in the data set that is above or below a threshold.

13. The system of claim 8, wherein the processing device is further configured to:

decompose the data matrix into a plurality of data matrices that include data associated with the first latent factor or the second latent factor, wherein the decomposed data matrix includes the first feature.

14. The system of claim 8, wherein the processing device is further configured to:

group the first latent factor and the second latent factor into a plurality of clusters and learn the first feature or the second feature based on the plurality of clusters.

15. A non-transitory computer-readable medium storing program code executable by a processor for iterative collaborative feature learning usable for accurately matching image content in queries to corresponding image results, the program code comprising:

program code for obtaining, by the processor, a data set that includes data indicating whether a user providing a text query clicked on a content item resulting from a search of the text query;

program code for determining, by the processor, an amount of missing data in the data set;

program code for generating, by the processor, derived data for the data set based on the amount of missing data being below a threshold amount of missing data;

program code for populating, by the processor, at least one missing data entry of the missing data in the data set using the derived data;

program code for determining, by the processor, a first latent factor of the content item from the data set, wherein the first latent factor includes information about a feature of the content item;

program code for learning, by the processor, a first feature of the content item based on the first latent factor;

program code for modifying the data set by populating an additional missing data entry of the missing data in the data set with the first feature;

program code for iteratively learning, by the processor, a second feature of the content item, wherein each iteration comprises:
- decomposing the modified data set to identify a second latent factor of the content item based on the modified data set, wherein the decomposing includes factorizing a data matrix that includes the modified data set, the data matrix being decomposed into a content item latent factors matrix and a text query latent factors matrix,
- wherein the second latent factor of the content item is learned based on a difference between additional latent factors of multiple text queries indicated by the text query latent factors matrix,
- grouping the first latent factor and the second latent factor into a cluster,
- learning the second latent factor of the content item based on the cluster, and
- learning the second feature of the content item based on the second latent factor; and program code for training a neural network to learn features by learning to classify a plurality of content items based at least partially on the first or the second feature of the content item.

16. The non-transitory computer-readable medium of claim 15, wherein the program code further comprises:
program code for receiving, by the processor, data associated with a query content item;
program code for determining, by the processor, latent factors of the query content item;
program code for learning, by the processor, features of the query content item; and
program code for outputting, by the processor, a recommendation indicating a recommended content item, wherein the recommended content item is similar to the query content item.

17. The non-transitory computer-readable medium of claim 15, wherein the program code further comprises:
program code for determining, by the processor, whether the user providing the text query clicked on the content item resulting from the search of the text query; and
program code for outputting, by the processor, a recommendation to the user indicating a recommended content item, wherein the recommended content item is similar to the content item clicked on by the user.

18. The non-transitory computer-readable medium of claim 15, wherein obtaining the data set includes removing, by the processor, outlier data from the data set to improve an accuracy with which the neural network classifies the plurality of content items, wherein outlier data includes data in the data set that is above or below a threshold.

19. The non-transitory computer-readable medium of claim 15, wherein determining the second latent factor of the content item includes:
decomposing the data matrix into a plurality of data matrices that include data associated with the first latent factor or the second latent factor, wherein the decomposed data matrix includes the first feature.

20. The non-transitory computer-readable medium of claim 15, wherein the program code further comprises:
program code for grouping, by the processor, the first latent factor and the second latent factor into a plurality of clusters; and
program code for learning the first feature or the second feature of the content item based on the plurality of clusters.

* * * * *